Figure 2:
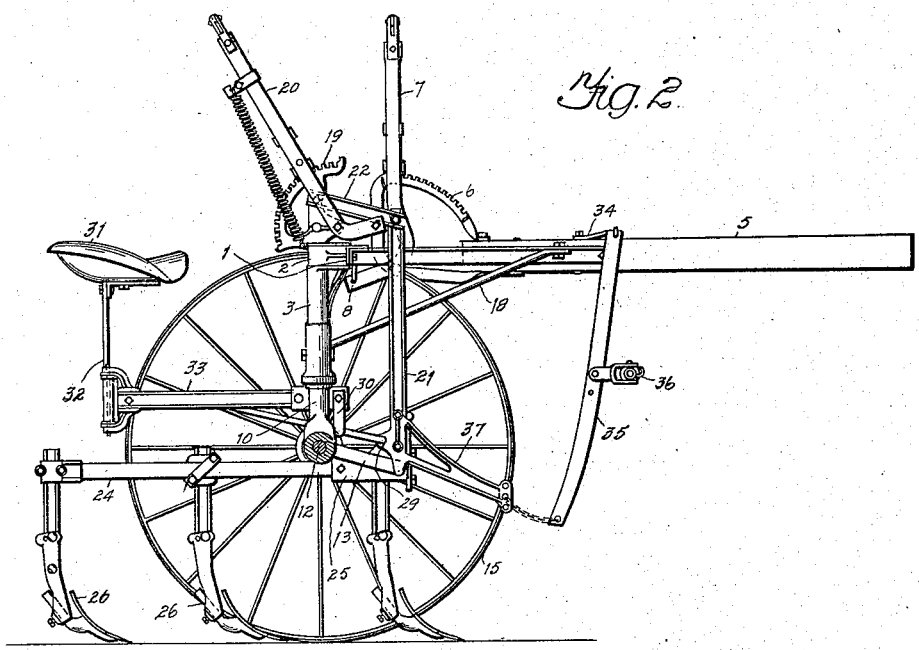

L. E. WATERMAN.
CULTIVATOR.
APPLICATION FILED OCT. 12, 1911.

1,201,398.

Patented Oct. 17, 1916.
3 SHEETS—SHEET 1.

Witnesses:
Robert N. Weir
E. Behel.

Inventor:
L. E. Waterman
by A. O. Behel
Atty.

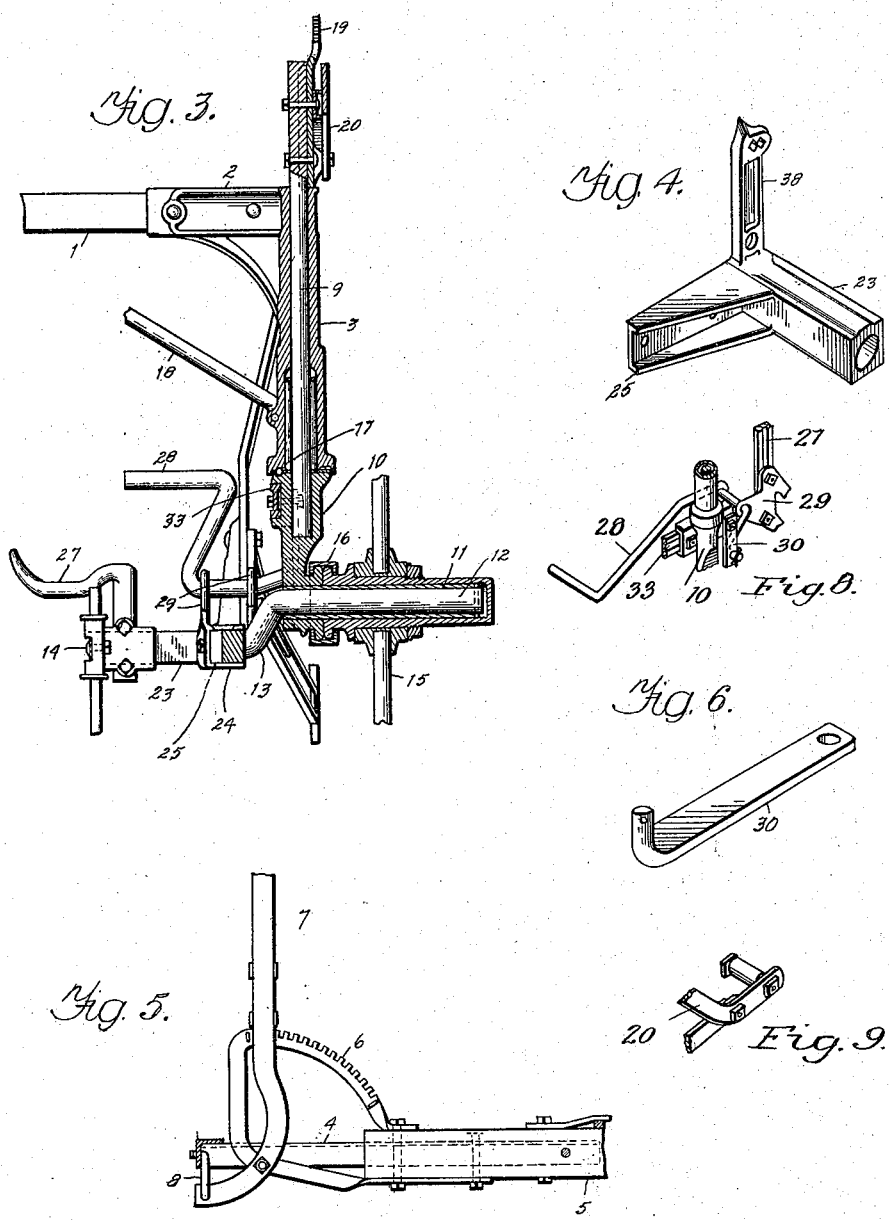

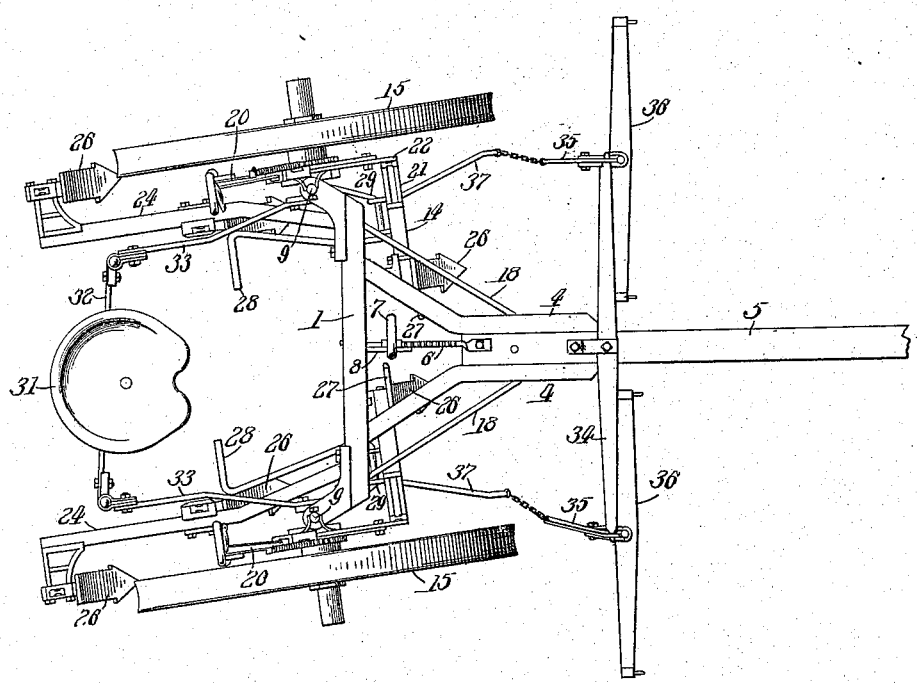

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

CULTIVATOR.

1,201,398.  Specification of Letters Patent.   Patented Oct. 17, 1916.

Application filed October 12, 1911. Serial No. 654,401.

*To all whom it may concern:*

Be it known that I, LEWIS E. WATERMAN, a citizen of the United States, residing at Rockford, in the county of Winnebago and State of Illinois, have invented certain new and useful Improvements in Cultivators, of which the following is a specification.

This invention relates in general to cultivators and has more particular reference to those known as "dodger" cultivators wherein the shovel-beams and supporting-wheels may be angled with respect to the line of draft in unison and in parallel relation.

It is well known to anyone familiar with the use of dodger cultivators, that in those types in general use in which the wheels and shovel-beams are angled in different relation or singly, the dodging of an obstacle by shifting the cultivator with respect to the line of draft results in a strained operation, the wheels acting in resistance to the shovels, which generally results in the wheels skidding. This resistance adds to the draft of the cultivator, and the skidding causes faulty cultivation.

In my invention I aim, primarily, to provide a dodger cultivator along such lines that its wheels and shovel-beams may be instantaneously angled to the line of draft in unison to effect immediate shifting of the cultivator in the desired direction and with absolutely no added resistance to the draft.

I also aim to provide seat supporting means movable in unison with the wheels and shovels and in such manner that the seat moves to the side of the row of plants opposite to that toward which the cultivator is guided by angling the wheels and wherein the driver may use practically his whole body in a natural side swinging movement to easily effect this operation.

Another object of my invention is to provide a cultivator of the lightest possible draft.

It is obvious that where the weight of the driver and the gangs is balanced against the tongue, the farther the seat and gangs extend to the rear of the machine the greater is the load on the wheels, and consequently the heavier is the draft. It is obvious that the closer the relation of the driver's seat and of the gangs with respect to the wheel axle, the less will be the draft. Moreover, if the gangs are so mounted as to be raised and lowered without affecting the balancing of the machine, the draft will obviously be further lightened. With these considerations in view my invention provides a novel arrangement and construction of shovel-beams, supporting-wheels, and seat, wherein the beams are raised and lowered in a perpendicular movement, that is maintained at all times in a horizontally disposed plane, and wherein the seat may be located relatively close to the supporting-wheel axle.

A further object of my invention is to provide a novel shovel-beam supporting and operating means for permitting all of the shovels to be raised and lowered uniformly and for permitting the working depth of the shovels to be uniformly adjusted by simply adjusting the lower limit of movement of the beam.

With these objects in view and the object of obtaining a cultivator of the lightest possible draft, I have provided a pair of quadrilateral frames substantially in the form of parallelograms, to each of which frames is connected a shovel-beam, the arrangement being such that the beams will be raised perpendicularly and be movable about a vertical axis intermediate their ends.

Another object is to provide means for carrying the shovels in such manner that when they are in working position in the ground their tendency will be to hold such position and to have a strong and positive suction, as contrasted with the operation of the shovels carried by beams pivotally mounted at their forward ends, in which case the shovels "float" and are more apt to shift to the surface and not permit the shovels to be maintained scoured.

Another object is to provide one set of levers adjustable for limiting the working depth of the shovels and an independent set for raising and lowering the shovels, whereby the shovels may be raised and lowered as often as desired without interfering with the set position of the levers determining the working depth.

More particularly, I provide hand-levers for adjusting and determining the working depth and foot-levers for raising and lowering the shovels.

I have also aimed to provide a cultivator of a narrow tread, yet one capable of working on fields having rows of plants relatively far apart, and also in gardens or fields where the plants are in relatively close rows. This is effected, primarily, by the novel shovel-beam supporting and operating mechanism and the particular arrangement and construction of the various parts.

By moving the shovel-beams vertically while maintained in a horizontal plane as aforementioned, surface blades or sweeps connected to the beams may be used to excellent advantage. These blade knife-like shovels lying in substantially a horizontal plane operate just beneath the surface of the ground, and if when adjusting the beam to different depths, the beam is not moved uniformly in a vertical direction said blades will be positioned out of their proper working angle and will not operate effectively. This is another object for moving the shovel-beams uniformly perpendicularly as above described.

Figure 1:
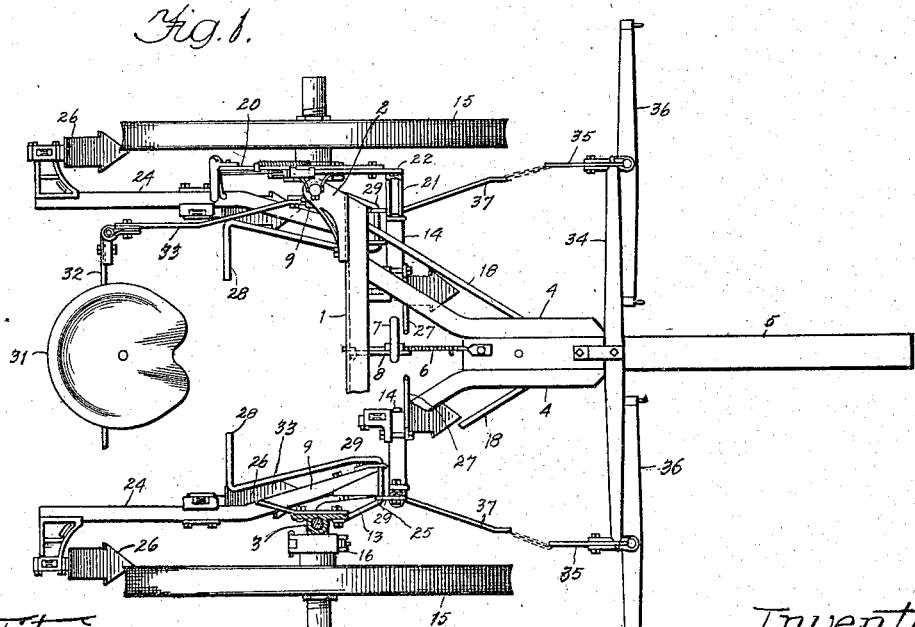

Other objects and many of the inherent advantages of this invention will be apparent as the same becomes better understood by reference to the following description, when considered in connection with the accompanying drawings, wherein:

Figure 1 is a plan view of a cultivator embodying my invention, portions of the cultivator being broken away and in section. Fig. 2 is a vertical section taken longitudinally and centrally through the cultivator. Fig. 3 is a transverse vertical section through one of the wheel supports. Fig. 4 is a detail perspective of a bracket to which the forward end of a beam is connected. Fig. 5 is an elevation of the adjustable connection between the rear end of the tongue and the frame. Fig. 6 is a perspective view of a link upon which a foot-lever fulcrums. Fig. 7 is a plan view of the cultivator showing the wheels and beams angled with respect to the line of draft. Fig. 8 is a fragmentary view in perspective of a foot-lever and its connection with the beam-supporting means; and Fig. 9 is a detail perspective of the lower end of one of the hand-levers.

By reference to the drawings, it will be seen that the frame of the cultivator comprises a transverse bar 1 to the outer ends of which are bolted brackets 2 each formed with a depending vertical-axis tubular section or bracket bearing 3. Hounds 4 are fixedly attached to the bar 1, extending forwardly therefrom; and a tongue 5 interposed between the hounds is pivotally connected therewith on a horizontal axis. The tongue is further connected to the frame through the intermediary of an adjustable connection comprising a toothed segment-bracket 6 fixedly connected to the rear end of the tongue and a hand-lever 7 pivotally connected at its lower end through link 8 to the cross-bar 1, and intermediate its ends to the segment-bracket 6, the hand-levers being equipped with the usual manually operated latch for engaging the segment teeth.

By adjustment of the lever 7 the rear end of the tongue may be rocked vertically to level the frame. Brace-rods 18 connect the tubular section 3 with the hounds 4. Each of the sections 3 forms a vertical-axis bearing bracket upon which is mounted in an associated manner a supporting-wheel and shovel-beam, and since the construction of these devices is substantially identical, a detailed description of one, which is clearly shown in Figs. 2 and 3, will suffice for an understanding of both. Journaled within the section 3 is a shaft 9 the outer ends of which extend beyond the ends of the section. Upon the lower end of the shaft is fixedly mounted an axle-support 10 provided with a horizontal sleeve-bearing 11. A roller-bearing 17 is interposed between the adjoining ends of the section 3 and axle-support 10 to facilitate swinging of the wheel-support on its vertical axis. A crank-axle with its axle 12 journaled in the sleeve 11 which is secured in the axle support 10 has its crank-arm 13 extending forwardly thereof and terminating in a horizontal crank end 14 parallel with the axle 12. A supporting-wheel 15 is journaled upon the sleeve 11 and is held in connection with the axle support through the cap-coupling 16. It will be evident that the members 10, 11 and the crank axle 12 constitute a supporting means connected with the shaft 9 so as to swing as an entirety about the axis of the bearing bracket 3. Fixedly mounted on the upper end of the shaft 9 is a toothed segment-bracket 19 arranged in a plane parallel with that of the crank-arm 13. A hand-lever 20 pivotally mounted intermediate its ends upon bracket 19 is provided with the usual catch engagement with the toothed segment. Bars 21 and 22 are pivotally connected at one end to the crank-end 14 and the segment bracket 19, respectively, and pivotally connected together at their opposite ends in such manner as to form a parallelogram frame clearly shown in Fig. 2, comprising bar 21, bar 22, crank-arm 13, and the frame section 3 and axle support. A pivotal connection of the bar 21 with the crank-end 14 will be more thoroughly described hereinafter. By this construction it is evident that the vertical bar 21 of the parallelogram frame has a parallel swinging movement vertically, carried and guided by the bar 22 and crank-arm 13, and that the frame may swing as a unit horizontally about the vertical axis shaft 9. The lower end of the hand-lever 20 is forwardly extended and carries a lateral extension, preferably a roller as shown in Fig. 9, disposed beneath the upper link 22 of the parallelogram frame. By swinging the hand-lever downwardly its forward end will raise the movable sides of the parallelogram frame. It will be seen that the lever when set with its forward end lowered serves as means for limiting the lowered position of said frame sides while permitting the same to be raised at any time independently of the lever.

A shovel-beam supporting-bracket shown in Fig. 4 having a tubular portion 23 journaled on the crank end 14, is formed with a radially extending beam-receiving portion 25 to which is bolted a shovel-carrying beam 24. Mounted upon the beam are a plurality of shovels 26 which may be of any suitable or preferred form. A shovel is also mounted on the inner end of the bracket 23 it being the foremost shovel as clearly shown in Figs. 1 and 2, and operating forward of the carrying-wheel axle. The bracket 23 is formed with an upright extension 38 to which is bolted the lower end of the bar 21, whereby the beam is held preferably at right angles with respect thereto and maintained in a horizontal position. It is through this bracket 23 that the bar 21 is pivotally connected to the crank-portion 14 as aforementioned. A foot-rest 27 clamped to the bracket 23 is adapted to be operated to swing the beam-carrying means and supporting-wheels as a unit laterally about the vertical axis of shaft 9. A foot-lever 28 of general U-shape with sides of different lengths as clearly shown in Fig. 8, has the end of its shorter side fulcrumed on the link 30 which is pivoted to an extension of the axle-support. The cross-end of the foot-lever is pivotally connected to ears 29 which are connected with the bracket 23, and the longer side of said lever extends rearwardly to within reach of the driver. By pressing down on the rear end of the foot-lever the crank 13 may be rocked to raise and lower the shovel beam.

To each of the axle-supports 10 is bolted a rearwardly extending bar 33, and the rear ends of these bars are connected by a cross-bar 32, the same being hingedly connected at its ends to the bars 33. A seat 31 is mounted upon the cross-bar 32. By this construction it will be manifest that the supporting-wheel and shovel-beam mounted as a unit at each side of the frame are connected so as to swing in unison upon their respective axes. It will also be noted that this construction permits the driver to be seated relatively close to the wheel axles. Any suitable draft means may be employed, it being preferable to connect such draft means directly to the forward ends of the cultivator shovel beams. In the present instance, I have shown merely for the purpose of conveying a clear understanding of the operation of my improved cultivator a draft means comprising an evener-bar, pendants 35 and swingle trees 36, the pendants being connected by chains to forwardly projecting arms 37 bolted to the upstanding portions 38 of the brackets 23.

It will be apparent from the foregoing description that at each side of the cultivator frame is mounted an independent mechanism which is movable as a unit in an oscillatory manner about a fixed vertical axis. Each mechanism comprises a supporting-wheel, a shovel-beam, and means both hand and foot operated for raising and lowering the shovel-beam. These operating mechanisms when oscillated, that is, swung on their respective axes and angled relative to the line of draft, move in unison and in parallel relation because of their connection through the seat supporting means. It will also be apparent that a novel means for supporting and operating a shovel-beam is provided in the form of the quadrilateral frame pivoted at its corners. By this means the shovel-beam will be maintained in a horizontal plane while in its working position and while being raised and lowered. By carrying the shovels all at an even distance below the beam as shown in Fig. 2, the beam may be lowered to operate all of the shovels at a uniform depth. In raising and lowering the beam the shovels will be operated evenly. When it is desired to adjust the working depth, it will be seen that by raising and lowering a beam all of the shovels will be moved an equal distance.

When cultivating, the hand-levers 20 are set to determine the desired working depth of the shovels, and having once set the shovels the operator may raise and lower the beams by the foot levers as often as necessary without disturbing the setting of the hand-levers. To angle the cultivator to either side the operator pushes forward on the foot rest 27 located at the side of the cultivator toward which he wishes to shift, and at the same time moves his body in the opposite direction as a counteraction to the foot movement. This is easy to accomplish and is not fatiguing because of the strong body muscles used and the little effort necessary. Since each associated wheel and beam shifts in unison about an axis centrally disposed relatively thereto, which axis is also intermediate the total working length of the shovels of the beam, the cultivator will travel immediately to the desired side and without increasing the draft. These features are very desirable because they permit quick and easy shifting of the cultivator without skidding or increase in the draft thereof.

When the shovels are in the ground in working position, the crank-arm 13 will be forwardly and downwardly inclined. Since the shovel-beam is pivotally connected to the forward end of said crank-arm and held from swinging on its pivot by the bar 21, the suction of the shovels will increasingly urge the crank-arm downwardly, thereby insuring that the shovels operate their full set depth and be kept scoured. When raising the beam, which occurs most generally at the ends of the rows, the foot-levers 28 are pressed downwardly by the operator. This action will swing the cranks 13 upon the wheel-axles and raise the bar 21 in a vertical plane, thus raising the beams maintained in a horizontal plane because of the relation and connection of said beams with said bars. Thus all the shovels of each beam will be raised from the ground at the same time and with little effort because of the particular leverage arrangements of the raising means.

My invention and its mode of operation will be clearly understood from the foregoing, and it will be obvious that while I have illustrated my invention as embodied in a single-row cultivator, the invention might be adapted to a multi-row cultivator, and that various changes and modifications in the details of construction illustrated and described may be resorted to without departing from the scope of the invention as set forth in the appended claims.

I claim—

1. In a cultivator, the combination with a frame, of a wheel-support including a shaft journaled thereon in a vertical axis and having a lower substantially horizontal sleeve, a wheel axle journaled in the sleeve and having a crank, earth-agitating means mounted on the crank independently of the frame, a link pivoted on the upper end of the shaft and having a connection with the crank, and a lever for actuating the link to swing the crank vertically.

2. In a cultivator, the combination with a frame having vertical sleeves, of vertical shafts journaled in the sleeves, wheel-supports fixed to the lower ends of the shafts and having horizontal sleeve portions, cranked axles journaled in said sleeve portions, levers mounted on the upper ends of the shafts and rotatable therewith, said levers having link connections with the axle cranks for swinging the same vertically, supporting bars fixed to the wheel supports, and foot levers, connected to the wheel-supports and to the cranks for swinging the same vertically.

3. In a cultivator, the combination of a frame having a vertical axis bearing bracket at each side thereof, supporting means journaled in each bearing, a supporting-wheel mounted on each supporting means, a substantially vertical bar pivotally connected at its upper and lower ends by links to each of said supporting means whereby the bar may swing vertically, earth-agitating means fixedly connected with the lower end of each of said bars, means for raising and lowering said bars, and means connecting the said supporting means whereby the wheels, earth-agitating means and said bars may swing in unison about the axes of the supporting means.

4. In a cultivator, the combination of a quadrilateral frame pivoted at its corners, having on one of its sides a stationary frame element and its opposite side so arranged that it will swing perpendicularly, a shovel-beam connected with said perpendicularly movable side, and means for raising and lowering the movable side of the quadrilateral frame.

5. In a cultivator, the combination of a quadrilateral frame pivoted at its corners, and having on one side a stationary frame element, a shovel-beam connected with movable sides of the quadrilateral frame, a lever for limiting the lower position of said sides, and means for raising and lowering said sides.

6. In a cultivator, the combination of a frame, a carrying-wheel mounted at each side of the frame to oscillate on a separate vertical axis, a crank connected with each wheel to oscillate therewith, each crank being pivoted on a horizontal axis and arranged with its crank arm extending forwardly from its axis and provided with an inwardly extending horizontally disposed arm, a cultivator-beam mounted on each of said horizontal arms, cultivating devices carried by each beam including a cultivating device at the rear end offset to the outer side of each beam, a cultivating device mounted on each horizontal crank arm offset to the inner side of its beam, and means for swinging the crank arms on their pivots to raise and lower the beams.

7. In a cultivator, the combination of a frame, an axle-support mounted at each side of the frame to oscillate on an upright axis, an axle journaled in said axle-support and formed with a crank, a supporting-wheel for each axle, a cultivating device mounted on the outer end of each crank so as to be movable vertically by swinging the same on its axle portion, and foot-operated means mounted upon and sustained by each axle support and connected with the crank thereof for swinging the same vertically.

8. In a cultivator, the combination of a frame, a supporting means mounted at each side of the frame to oscillate on an upright axis, a wheel and a cultivating device mounted on each supporting means to oscillate therewith, each cultivating device being movable vertically with respect to its supporting means, and foot-operated means mounted upon and movable laterally with each supporting means and connected with the cultivating device thereof for moving the same vertically.

9. In a cultivator, the combination of supporting means mounted to oscillate on an upright axis, a wheel and a crank member mounted on said means to oscillate therewith, the crank member being pivoted on a horizontal axis and extending forwardly therefrom, a cultivating device connected with the forward end of the crank member so as to be raised and lowered thereby, and a foot-lever pivotally mounted upon and sustained by said supporting means and connected with the outer end of the crank member whereby to swing the same vertically.

10. In a cultivator, the combination of supporting-means mounted to oscillate upon an upright axis, a wheel and a crank member mounted on said means to oscillate therewith, the crank being pivoted on a horizontal axis and extending forwardly therefrom, a cultivating device connected with the outer end of the crank member, and foot-operated means pivotally mounted intermediate its ends on said supporting means and connected at its forward end with the outer end of the said crank member and being operable at its rear end for swinging the said crank member on its pivot.

11. In a cultivator, the combination of a frame, a crank member mounted thereon to turn on an upright and a horizontal axis and extending forwardly from the latter, a cultivating device connected with the forward end of said crank member so as to be raised and lowered and swung laterally thereby, and a foot lever fulcrumed intermediate its ends in connection with the crank member so as to oscillate therewith and connected at its forward end with the corresponding end of the crank member whereby the foot lever may be operated at its rear end to move the cultivating device vertically.

12. In a cultivator, the combination of a crank member and a foot lever arranged in juxtaposition and mounted to oscillate together on an upright axis and to swing on a horizontal axis, the crank member extending forwardly from its horizontal axis and being connected with the foot lever, and a cultivating device connected with the outer end of the crank member so as to be raised and lowered thereby upon operation of the foot lever.

13. In a cultivator, the combination of a horizontally disposed crank member mounted to oscillate on an upright axis and a horizontal axis and extending forwardly from the latter, a cultivating device connected with the forward end of said crank member so as to be movable vertically thereby, means for oscillating the crank member to move the cultivating device laterally, and foot-operated means connected with the crank member and being operable at the rear of the horizontal axis thereof for moving the crank member and likewise the cultivating device vertically.

14. In a cultivator, cultivating-device-operating means mounted to oscillate on an upright axis and on a horizontal axis intermediate its front and rear ends, and a cultivating device connected to the forward end of said means so as to be raised and lowered and moved laterally thereby, the said means being foot operable at its rear end for rocking said means on its horizontal axis to move the cultivating device vertically.

15. In a cultivator, the combination of a frame, an upright journal bearing secured thereto, a shaft journaled in said bearing, a bracket mounted on the lower end of said shaft so as to turn on the axis thereof, an axle and a crank member mounted on said bracket, the latter being pivoted on a horizontal axis and extending forwardly therefrom, a wheel for the axle, a cultivating device mounted on the outer end of the crank member, a pivotal link connection between the outer end of the crank member and the upper end of the shaft, a hand lever mounted upon the upper end of the shaft and coöperating with said link connection so as to limit lowering but permit upward movement thereof, and foot-operated means mounted on the bracket and connected with the outer end of the crank member for moving the same vertically independently of the said hand lever.

16. In a cultivator, the combination of a quadrilateral frame pivoted at its corners, one side of the frame being a vertically disposed, relatively stationary element and its opposite side being movable vertically with respect thereto, a cultivating device connected with said movable side so as to be raised and lowered thereby, and a bell-crank lever mounted in juxtaposition to the upper member of said frame and having one arm coöperating with a toothed segment and its other arm with said upper member so as to swing the same and likewise the cultivating device vertically.

17. In a cultivator, the combination of a frame, a crank member mounted thereon to oscillate on an upright and a horizontal axis and having at its outer end a horizontally extending arm, a bracket journaled thereon and provided with an upstanding arm, a cultivator-beam fixedly secured to said bracket, and means secured to said upstanding arm maintaining the cultivator-beam substantially horizontal and being operable to swing the crank member on its upright axis for angling the cultivator-beam to the line of draft.

18. In a cultivator, the combination of a frame, a crank member mounted thereon to oscillate on an upright and a horizontal axis and having at its outer end a horizontally extending arm, a bracket journaled on said arm, a cultivating device mounted on said bracket, a cultivator beam secured to the bracket laterally of said cultivating device, a cultivating device mounted on said beam, means for swinging the crank member vertically to raise and lower the cultivating devices, and means for swinging the crank member on its upright axis to angle said cultivating devices to the line of draft.

19. In a cultivator, the combination of a quadrilateral frame pivoted at its corners, certain of its sides being arranged in upright position and one of these being a relatively stationary element so that its opposite side disposed forwardly thereof may swing vertically with respect thereto, a horizontally disposed cultivator beam fixedly connected with the lower portion of said movable upright frame member, means permitting the said movable member to swing horizontally on an upright axis substantially coincident with its opposite frame member, and means for controlling the vertical and horizontal swinging movements of said frame member.

20. In a cultivator, the combination of a quadrilateral shovel supporting frame pivoted at its corners, a hand lever for raising one of the links of the quadrilateral frame, and a releasable catch for holding the frame in raised position, said hand lever being movable to a set position independently of said frame to move a stop associated therewith to a position for limiting lowering movement of the frame.

In testimony whereof I have hereunto set my hand in presence of two subscribing witnesses.

LEWIS E. WATERMAN.

Witnesses:
A. O. BEHEL,
E. D. E. N. BEHEL.

Copies of this patent may be obtained for five cents each, by addressing the "Commissioner of Patents. Washington, D. C."